United States Patent
Stewart et al.

(10) Patent No.: US 10,311,440 B2
(45) Date of Patent: Jun. 4, 2019

(54) CONTEXT-AWARE DETERRENT AND RESPONSE SYSTEM FOR FINANCIAL TRANSACTION DEVICE SECURITY

(71) Applicant: INTERNATIONAL BUSINESS MACHINES CORPORATION, Armonk, NY (US)

(72) Inventors: Osamuyimen Stewart, Nairobi (KE); Komminist Weldemariam, Nairobi (KE)

(73) Assignee: International Business Machines Corporation, Armonk, NY (US)

(*) Notice: Subject to any disclaimer, the term of this patent is extended or adjusted under 35 U.S.C. 154(b) by 294 days.

(21) Appl. No.: 15/162,880

(22) Filed: May 24, 2016

(65) Prior Publication Data
US 2017/0344993 A1 Nov. 30, 2017

(51) Int. Cl.
*G06Q 20/40* (2012.01)
*G06Q 20/32* (2012.01)
*G06Q 40/02* (2012.01)

(52) U.S. Cl.
CPC ....... *G06Q 20/405* (2013.01); *G06Q 20/3224* (2013.01); *G06Q 20/4016* (2013.01); *G06Q 40/02* (2013.01)

(58) Field of Classification Search
CPC .................................................. G06Q 20/405
See application file for complete search history.

(56) References Cited

U.S. PATENT DOCUMENTS

| | | | | |
|---|---|---|---|---|
| 5,519,669 A * | 5/1996 | Ross | ....................... | G01S 15/02 340/541 |
| 6,970,183 B1 * | 11/2005 | Monroe | ................. | G08B 7/062 348/143 |
| 2004/0177053 A1 * | 9/2004 | Donoho | ................. | G06Q 10/04 706/47 |
| 2008/0074496 A1 * | 3/2008 | Venetianer | ......... | G06K 9/00335 348/150 |
| 2008/0258880 A1 * | 10/2008 | Smith | .................... | G08B 21/10 340/286.02 |
| 2009/0271343 A1 * | 10/2009 | Vaiciulis | .............. | G06N 99/005 706/21 |
| 2010/0161370 A1 * | 6/2010 | Bloom | ................. | G06Q 10/047 705/7.12 |
| 2013/0027561 A1 * | 1/2013 | Lee | ........................ | G06Q 30/02 348/150 |
| 2014/0232861 A1 * | 8/2014 | Naidoo | .................... | H04N 7/18 348/143 |

(Continued)

OTHER PUBLICATIONS

Kingson-Bloom, Jennifer, "Live Citibank Video System Watches Over ATMs", American Banker 163.106: 16. SourceMedia, Inc., Jun. 5, 1998. (Year: 1998).*

(Continued)

*Primary Examiner* — Eric T Wong
(74) *Attorney, Agent, or Firm* — Eyal Gilboa; Hoffman Warnick LLC

(57) ABSTRACT

The disclosure provides systems and methods for increasing the security of financial transaction devices and other places of value. Increased security is provided by analysis of a plurality of sensor and other inputs, and formulation of context-sensitive response plan involving the most probably effective response agents.

13 Claims, 5 Drawing Sheets

(56) References Cited

U.S. PATENT DOCUMENTS

| | | | | |
|---|---|---|---|---|
| 2014/0267735 A1* | 9/2014 | Carey | .................... | G07F 9/026 |
| | | | | 348/150 |
| 2015/0350233 A1* | 12/2015 | Baxley | ................... | H04W 4/90 |
| | | | | 726/1 |
| 2017/0069051 A1* | 3/2017 | Petitt, Sr. | ............. | G06Q 50/265 |
| 2017/0316357 A1* | 11/2017 | Meganathan | ...... | G06Q 10/0635 |

OTHER PUBLICATIONS

Maxwell, Stevens, "Security Essentials", Buildings, Aug. 2005. (Year: 2005).*

* cited by examiner

CONTEXT-AWARE DETERRENT AND RESPONSE SYSTEM FOR FINANCIAL TRANSACTION DEVICE SECURITY

FIELD OF THE INVENTION

In embodiments, the technical field of the invention is methods and systems for security, more specifically in safeguarding financial transaction devices and locations.

BACKGROUND

Automatic Teller Machine (ATM) and Point of Sale (POS) terminals promote inclusive financial systems in Africa. Banks are investing more and more in ATM's deployment to be closer to their clients and available at all times. However, the proliferation of new mobile money by telecos (e.g., mobile money) is already disrupting the traditional banking systems. Banks are trying to cope with this by extending their ATM and POS coverage for actual dispensing of money.

Repeated instances of thieves attacking ATMs to break in and steal money are a growing concern among banks. Using instruments or equipment, thieves hit the sides and back of the ATMs and/or POSs and gain access to the vault/storage that usually resides at the back. This is different from other known cases of fraud, e.g.: where cards are cloned and fraudsters pillage other people's accounts; where thieves steal credit cards and associated PIN to commit credit card fraud; and where thieves steal a mobile money PIN to commit fraud.

In a growth market such as Africa, current ATM or POS security come in two forms: deploy trained security officers to physically observe and safeguard the ATM premises; and use sensors (e.g. camera, infrared sensors) to monitor the physical location and environment of the ATMs mainly to ensure the privacy of the customer while performing transaction. Responses to (ATM or POS) security incidents are mostly human driven. This has several challenges, including: incident reporting, processing and coordination involve several ad-hoc processes; there is a partial or complete lack of understanding of the characteristic and context of the incident (including incident verification) while responding to it; and there is no automated context-aware deterrent responses (including linguistic variability) as a stop gap while the response team is underway.

SUMMARY OF THE INVENTION

A goal of this invention is to introduce an intelligent deterrent and response system for security of financial transaction devices in growth market using static and dynamic features generated from multiple sensors combined with other data sources. A response plan consisting of multiple levels of responses is personalized to provide deterrent responses for banking terminals (such as ATM and POS) security as the generation and coordination of responses are dynamically tailored based on context, previously detected incidents patterns and models. The systems and methods detect, for example, theft activities and behavioral changes in and around financial transaction devices toward accurate and dynamic deterrent response and coordination. In embodiments, the systems and methods generate a set of context relevant deterrent response plans that improves the security of financial transaction devices through sensing and monitoring behavioral changes, using on-device and on-cloud analytics.

Challenges overcome by the current invention include, in various embodiments, one or more of the following: generation of multiple levels of protection responses from sensors for a selected theft attempt or attack, wherein the response and coordination depends in real-time on the accurate detection and characterization of the perpetrator behaviors with the relevant context; identification and characterization of the attack/scene from the sensors data, thus determining the responses in real-time tailored to the context of the attack/scene, and further generating and distributing alerts to mobile agents; identifying recommended response plans on cloud for security protection and making such plans available to mobile agents on demand; using context-aware historical information to predict the behavior and calibrate the learning models (on cloud) and update the local model accordingly; and dynamically deciding and communicating the deterred plan of the scene/attack based on static and dynamic features identified from the sensors and context.

In an aspect, then, is a method comprising: receiving a sensor reading from a sensor positioned proximal to a financial transaction device, the sensor reading pertaining to an incident; receiving a contextual data item pertaining to the financial transaction device; calculating an expected risk profile based on the sensor reading and contextual data item; determining an appropriate response element based on the financial transaction device and the expected risk profile; and initiating a response from the response element. In embodiments:

the sensor reading and contextual data item are received by a server via a network, the server positioned remote from the financial transaction device, and wherein the initiating a response comprises transmitting, by the server, an instruction configured to initiate the response from the response element;

the sensor reading and contextual data item are received by a local device proximal to or integral with the financial transaction device;

the sensor reading and contextual data item are received by a local device proximal to or integral with the financial transaction device, and wherein the initiating a response comprises transmitting, by the local device, an instruction configured to initiate the response from the response element;

the incident is selected from a theft, a violent act, and a combination thereof, and involves one or more than one perpetrator;

the sensor is selected from a camera, microphone, Infrared (IR) sensor, light sensor, motion sensor, vibration sensor, and touch sensor;

the contextual data item is selected from a status of the financial transaction device, financial transaction device ID, a geo-location of the financial transaction device, the time, a traffic report, and an activity report;

the expected risk profile comprises a probability and an expected incident description;

the appropriate response element is selected from a private security detail and a public law enforcement detail, and is determined based on the location of the response element and the capabilities of the response element;

the method further comprises determining an appropriate response plan based on the geo-location of the financial transaction device and the expected risk profile;

the method further comprises determining an appropriate response plan based on the geo-location of the financial transaction device and the expected risk profile, wherein the response plan comprises initiating an audio message from a device proximal to the financial transaction device, changing a status of the financial transaction device; and the determining of the appropriate response element comprises accepting input from a human operator.

In an aspect is a method comprising determining a response plan responsive to an incident involving a financial transaction device at a financial transaction location from a set of inputs, the set of inputs comprising a sensor reading from a sensor located at the financial transaction location and a contextual data item from a contextual data source. In embodiments:

the method further comprises of determining contextually relevant (e.g. geo-tagged) alert message and distribute to mobile agents by finding the closest agents to the scene area;

the mobile agents unpack the alert message and display on incident dashboard; and the method further comprises of fetching additional details about the incident and response plan from the financial transaction central control room hosted in a cloud environment.

In an aspect, is a method comprising: receiving, by a server via a network, a sensor reading from a sensor positioned proximal to a financial transaction device, the sensor reading pertaining to an incident; receiving by the server via the network, a contextual data item pertaining to the financial transaction device; calculating an expected risk profile based on the sensor reading and contextual data item; determining an appropriate response element based on the financial transaction device and the expected risk profile; and initiating a response from the response element.

In an aspect is a system comprising: a processor; and a memory couple to the processor, the memory configured to store program instructions for instructing the processor to carry out a method as above. In embodiments:

the program instructions are configured to initiate a reasoning engine, the reasoning engine configured to calculate the expected risk profile and appropriate response element;

the program instructions are configured to initiate an engine selected from an image, audio and video engine (detects, locates, tracks and identifies moving and fixed object around the scene to understand the context, by combining one or more sensor data); a language engine (analyzes the linguistics aspects of the sensors input to determine the language, dialect, or slang of the perpetrator); a mapping engine (correlates the detected language, dialect, or slang with cluster of socio-economic group); a counting engine (counts the number of people around the scene); a distance engine (calculates the distance between the machine and each of the detected people using infrared technology); a pattern engine (determines the probability of the detected behavior is related to theft incidents using other similarly past incidents and contextual data); and a risk assessor engine (determines the expected risk level if the attack is successful);

the program instructions are configured to identify similar historical responses, apply probabilistic algorithms to find the most likely optimal response plan, and predicted behavior of response elements;

the program instructions are configured to determine incident severity (e.g., low, medium, high) based on past incident patterns, the sensor reading, and the contextual data item (e.g., and current state of the machine e.g. the amount money installed or present at the time of the incident attempt in the machine);

the system is a server on a network; and the system is a local device configured to be installed proximal to or integral with a financial transaction device.

In an aspect is a system comprising a communications component, a sensor component, and a response component, wherein the system is configured to communicate a sensor reading to a server via a network, the sensor reading pertaining to an incident involving a financial transaction device at a financial transaction location, the server configured to use the sensor reading in determining a response plan comprising a contextually relevant alert message.

In an aspect is a system comprising a communications component, a sensor component, and a response component, wherein the system is configured to obtain a sensor reading, the sensor reading pertaining to an incident involving a financial transaction device at a financial transaction location, and the response component is configured to use the sensor reading in determining a response plan responsive to the incident.

In an aspect is a system comprising a communications component, a sensor component, and a response component, wherein the system is configured to obtain a sensor reading and a contextual data item, the sensor reading and contextual data item pertaining to an incident involving a financial transaction device at a financial transaction location, and the response component is configured to use the sensor reading and contextual data item to determine a response plan responsive to the incident.

In embodiments of the above systems:

the response plan comprises a contextually relevant alert message;

the system is configured to communicate the sensor reading to a server via a network, the server configured to use the sensor reading in determining a response plan comprising a contextually relevant alert message;

the system is contained within a housing and configured to be attached to the financial transaction device or in a location suitable for surveillance of the financial transaction device;

the system further comprises a speaker configured to relay an audio message;

the communications component is configured for communicating with a cellular network, a WIFI or Bluetooth network, and/or a LAN or other fixed network; and the server is configured to process and display various data gathered by the system in a dashboard for an operator.

These and other aspects of the invention will be apparent to one of skill in the art from the description provided herein, including the examples and claims.

DETAILED DESCRIPTION OF VARIOUS EMBODIMENTS

Figure 1:
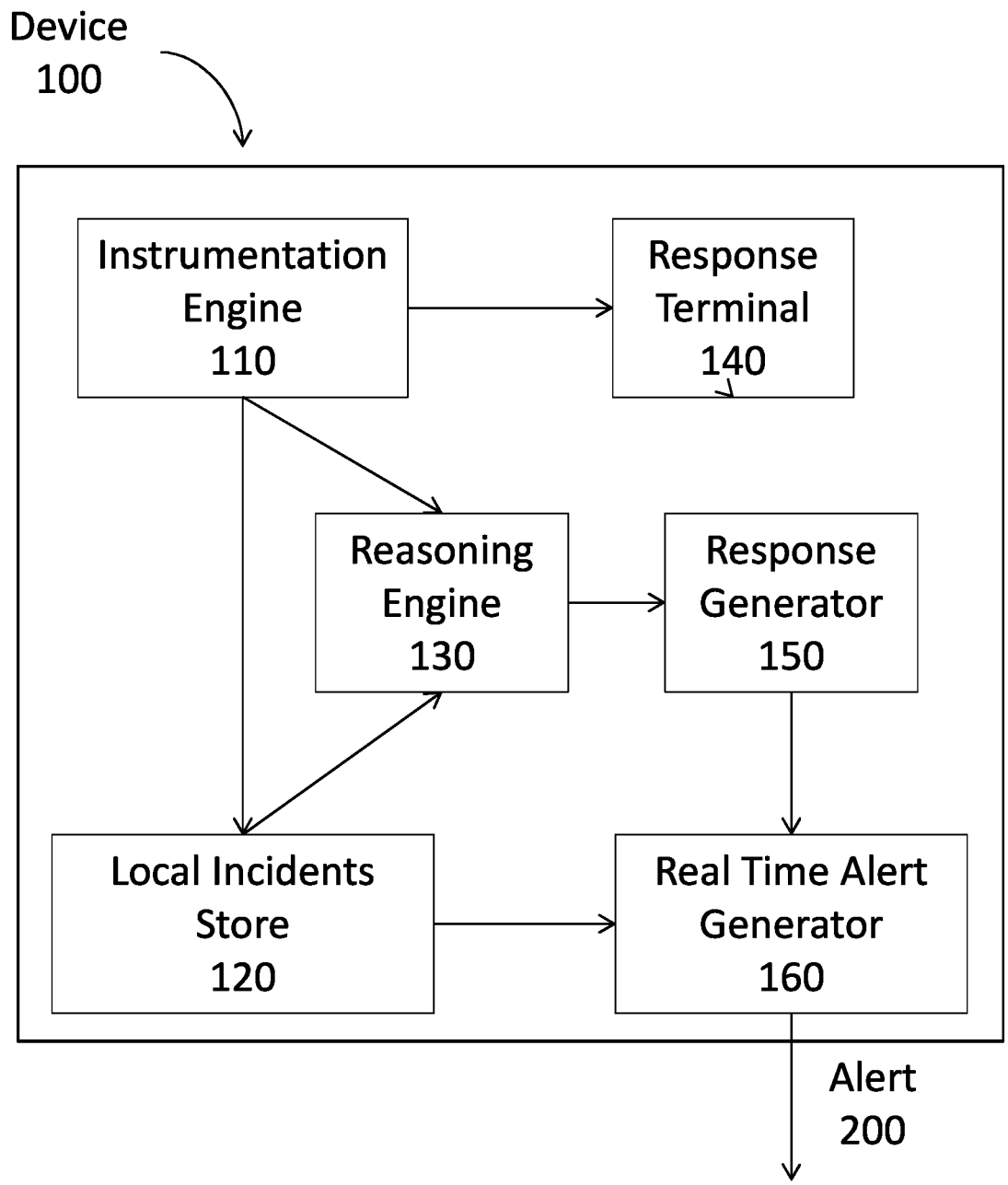
FIG. 1 provides a flowchart for a device according to an embodiment of the invention.

Throughout this disclosure, the term Financial Transaction Device (FTD) refers to an automatic teller machine (ATM), a point of sale (POS) device, a mobile money (e.g., MPESA®) agent using a mobile phone to conduct mobile money transactions, or any other electronic device, stand alone or otherwise, used to conduct financial transactions. The use herein of the term FTD, however, is merely exemplary and for the purpose of illustrating various aspects of the invention, and is therefore not intended to be so limiting. It will be appreciated, then, that an FTD is a proxy for any point of sale or point of security. The systems and methods can be applied, for example, to security in a house or building. A perpetrator breaking and entering a house or business could trigger the system to generate a response as described herein.

In an aspect is a method comprising: receiving a sensor reading from a sensor positioned proximal to a financial transaction device, the sensor reading pertaining to an incident; receiving a contextual data item pertaining to the financial transaction device; calculating an expected risk profile based on the sensor reading and contextual data item; determining an appropriate response element based on the financial transaction device and the expected risk profile; and initiating a response from the response element.

In an aspect is a method comprising: receiving, by a server via a network, a sensor reading from a sensor positioned proximal to a financial transaction device, the sensor reading pertaining to an incident; receiving by the server via the network, a contextual data item pertaining to the financial transaction device; calculating an expected risk profile based on the sensor reading and contextual data item; determining an appropriate response element based on the financial transaction device and the expected risk profile; and initiating a response from the response element.

In an aspect is a method comprising determining a response plan responsive to an incident involving a financial transaction device at a financial transaction location from a set of inputs, the set of inputs comprising a sensor reading from a sensor located at the financial transaction location and a contextual data item from a contextual data source.

In an aspect, is a method comprising: receiving, by a server via a network, a sensor reading from a sensor positioned proximal to a financial transaction device, the sensor reading pertaining to an incident; receiving by the server via the network, a contextual data item pertaining to the financial transaction device; calculating an expected risk profile based on the sensor reading and contextual data item; determining an appropriate response element based on the financial transaction device and the expected risk profile; and initiating a response from the response element.

In an aspect is a system comprising a communications component, a sensor component, and a response component, wherein the system is configured to communicate a sensor reading to a server via a network, the sensor reading pertaining to an incident involving a financial transaction device at a financial transaction location, the server configured to use the sensor reading in determining a response plan comprising a contextually relevant alert message.

In an aspect is a system comprising a communications component, a sensor component, and a response component, wherein the system is configured to obtain a sensor reading, the sensor reading pertaining to an incident involving a financial transaction device at a financial transaction location, and the response component is configured to use the sensor reading in determining a response plan responsive to the incident.

In an aspect is a system comprising a communications component, a sensor component, and a response component, wherein the system is configured to obtain a sensor reading and a contextual data item, the sensor reading and contextual data item pertaining to an incident involving a financial transaction device at a financial transaction location, and the response component is configured to use the sensor reading and contextual data item to determine a response plan responsive to the incident.

In an aspect is a system comprising a communications component, a sensor component, and a response component, wherein the system is configured to communicate a sensor reading to a server via a network, the sensor reading pertaining to an incident involving a financial transaction device at a financial transaction location, the server configured to use the sensor reading in determining a response plan comprising a contextually relevant alert message.

In an aspect is a system and method to determine multiple levels of deterrent responses required for buying time from perpetrators. Responses are generated through interactions between human subject and machines, instrumentation of environment and context sensors. The device components are managed by rules based on the intensity of the attack behavior and are able to decide suitable first-level basic response. A reasoning engine perform various operation based on the incoming incident data and locally stored incident patterns to understand the scene/attack. The method may be used to determine the static and dynamic features of the incident from multiple sensors to determine the incident characteristic, context and ambient environment. The method may be used to determine the response levels based on sensors' detected static and dynamic features and other contextual data.

The method of reasoning further includes: an image and video engine that detects, locates, tracks and identifies moving and fixed object around the scene to understand the context, by combining one or more sensor data; a language engine that analyzes the linguistics aspects of the sensors input to determine the language, dialect, or slang of the perpetrator; a mapping engine that correlates the detected language, dialect, or slang with cluster of ethnic group or socio-economic group; a counting engine that counts the number of people around the scene; a distance engine that calculates the distance between the machine and each of the detected people using infrared technology; a pattern engine that determines the probability of the detected behavior is related to theft incidents using other similarly past incidents and contextual data; and/or a risk assessor engine that determines the expected risk level if the attack is successful.

The methods may be used to determine contextually relevant (e.g. geo-tagged) alert message and distribute to response elements by finding the closest and best equipped agents to the scene area. The methods may be used to determine incident severity as Low, Medium, or High based on past incident patterns and current state of the machine e.g. the amount money installed in the machine. The systems and methods may be used to identify similar historical responses, and further include probabilistic algorithms to find the most likely optimal response plan and predicted behavior to broadcast response plan to mobile agents.

The inventive methods may be implemented in any convenient fashion, three of which are now described. In a first method, a remote server is configured to receive sensor data from sensors proximal to a financial transaction device, as well as to receive contextual data from a variety of sources. The server processes the sensor and contextual data and formulates responses, which are then communicated to the relevant recipients (including the financial transaction device itself). Such method may be referred to herein as a "cloud-based" method, and may involve a server in a centralized control room or a similar setup. In some embodiments of this method, the sensor on location at the FTD may have zero or minimal storage and computing capability, and may simply relay sensor data (live streamed or in packets). The server does all or most of the storage and processing of data. In a second method, a local device proximal to a financial transaction device is used rather than a remote server—the local device is capable of processing sensor data and contextual data to formulate responses, and the local device then is further capable of initiating the determined response. In such methods, the local device contains storage, processing and communication abilities. A third method is a combination, using both a server and a local device capable of communicating there-between in order to determine and carry out responses.

By the term "proximal" such as "proximal to a financial transaction device" is mean that the sensor is positioned close enough to gather data (e.g., "incident" data) directly involving or otherwise affecting the financial transaction device. The sensor may be located directly within (i.e., integral with) a FTD, or in the general vicinity and within sensor range. For example, for an ATM located in an enclosure, the sensor may be located within the ceiling panels of the enclosure or anywhere else suitable for monitoring the ATM. The sensor may be obscured or in plain sight, as appropriate, provided that the location of the sensor enables suitable sensor readings.

A variety of sensors are suitable for the invention. The sensor should be of the type and positioned so as to provide a sensor reading relevant to an incident. Multiple sensors may be used, as well as sensors that record multiple inputs. The nature of any particular incident may affect whether a particular sensor is suitable for that incident, and not all sensors may be suitable for all incidents. Accordingly, depending on the sensor that is located at a particular FTD during a particular incident, the sensor may or may not be able to record relevant data. In embodiments, therefore, it is desirable to select one or more sensors that are most relevant for the type of incident most likely to occur at a specific FTD. In embodiments, the sensor is selected from a camera, microphone, Infrared (IR) sensor, light sensor, motion sensor, vibration sensor, and touch sensor. Alternatively or in addition, the sensor may collect data such the presence or movement of shadows, light, the number of people and their relative interactions and positions, the way that people are dressed, moving, interacting, etc., the presence or absence of traffic, weather, etc. In embodiments, the sensor data is used as raw data that is processed by system software for interpretation.

In embodiments, the devices and methods of the invention include an ability to activate a sensor during (or just before) an incident, and to keep the sensor off or in stand-by mode at other times. Alternatively stated, the sensor can be off or in stand-by mode as a default setting. The systems/methods can distinguish between normal (legitimate) activities and abnormal (illegitimate) activities indicative of an incident, and can activate the sensor for the latter. These abilities provide energy savings, data savings, etc. In other embodiments, however, the sensor is operating at all times.

A variety of incidents are possible at FTDs for which it is desirable to apply the current invention (i.e., recording sensor data, formulate a response plan, etc.). The incident may involve a single perpetrator (thief, attacker, etc.) or a plurality of perpetrators working in collaboration. The incident may involve a weapon (gun, hammer or other bludgeon, automobile, etc.), tool (screwdriver, electronic fraud device, etc.), or a combination thereof. The incident may involve direct interaction with the perpetrator and the FTD (e.g., a smashing and robbery of an ATM machine, or an electronic theft of PIN or credit card data), or may involve an indirect interaction mediated through a bystander (e.g., a perpetrator forcing a bystander to withdraw money from an ATM). In embodiments, the incident is selected from a theft, a violent act, and a combination thereof, and involves one or more than one perpetrator.

In addition to the sensor data, a variety of other data referred to herein as contextual data may be obtained by the systems disclosed herein in order to formulate a response. One such contextual data item is the geo-location (also referred to herein as "location") of the FTD. This may be obtained directly from the sensor reading, e.g., when the sensor reading is GPS coordinates or comprises GPS coordinates as metadata. Alternatively, the sensor reading may be obtained with metadata that comprises a FTD identification (ID), such as an assigned alpha-numeric value, and the received ID can be cross-referenced with a database containing IDs and FTD locations. In embodiments, the FTD location is used by the system in determining a suitable response, particularly if certain incidents are more common in specific locations. The location is also important for determining a suitably close response element, as described herein.

Another contextual data item is the FTD ID, as mentioned above. In addition to enabling determination of the FTD location, an FTD ID enables the system to determine the type of FTD (e.g., ATM, POS, etc.), the real-time contents of the FTD, the defensive capabilities of the FTD, and other factors pertaining to specific FTDs.

Another contextual data item is the current status of the FTD. The status may include a variety of data, such as the amount of money stored in the FTD, whether there is a power outage affecting the FTD, and the like.

Another contextual data item is the time of the sensor reading. The time may be metadata recorded by the sensor itself, or may be supplied by an external clock located at the FTD or at the server. Another contextual data item is a weather report about the location of the FTD. This item may be supplied by a weather sensor at the FTD or by an external weather reporting station/source. Another contextual data item is a traffic report, which may refer either to vehicle traffic or pedestrian traffic in the area around the FTD. Another contextual data item is an activity report, such as an activity report for the FTD (e.g., the number of transactions over a given period of time), or an activity report from a law enforcement authority (e.g., a crime or other incident report for a given location and time), or the like.

All or some of the contextual data mentioned above and herein (as well as any other relevant contextual data that may be desired or beneficial) may be obtained in order to assist the system in developing a suitable response. The system may fetch additional details about the incident as desired when formulating a response plan. A plurality of contextual data items may be fetched/received by the system. Also, a plurality of sensor data may be obtained.

The methods and systems involve receiving and processing sensor data. In embodiments, the sensor reading and contextual data item are received by a server via a network, the server positioned remote from the FTD. In embodiments, the sensor reading and contextual data item are received by a local device proximal to or integral with the financial transaction device.

In embodiments, the systems and methods enable self-organization of the sensors based on encoded rules. For example, sensing by a vibration sensor of a sufficient collision intensity (i.e., the force/touch applied to the body of ATM, e.g. in attempt to break the machine cabin) may enable more sensors (e.g. camera and audio sensors) to activate and further document the ambient environment, context, etc.

In embodiments, the systems of the invention process the received sensor and contextual data in order to develop an expected risk profile. The expected risk profile comprises a probability and an expected incident description. The description may include various characteristics, including number of perpetrators, type of attack, weaponry used in the attack, and characteristics of the financial transaction device, etc.

In embodiments, the methods describe herein further comprise determining an appropriate response plan based on one or a plurality of factors, including: sensor data; contextual data from a contextual data source; the geo-location of the FTD; the calculated expected risk profile; input from a human operator; identified similar historical incidents (similarity according to one or more of sensor input, location, time of day, etc.); identified similar historical responses; determined incident severity (e.g., low, medium, high) based on past incident patterns, sensor data, and the contextual data item (e.g., and current state of the machine e.g. the amount money installed or present at the time of the incident attempt in the machine); predicted behavior of response elements;

In embodiments, the system is configured to identify similar historical responses, apply probabilistic algorithms to find the most likely optimal response plan, and predicted behavior of response elements.

The response plan is calculated based on one or more of the above factors, as well as other relevant information as available, and may involve one or more response elements (described in more detail below) and/or one or more response actions.

In embodiments, the response plan comprises initiating an audio message from a device proximal to the FTD. For example, the system may use the ambient sensor data and linguistic mapping to automatically generate basic (e.g. "Hey, I am sensing that you are trying to talk to me.") and advanced contextualized deterrent responses ("Hey, I watch both of you 2 meters away from me in a heavy rain." "Hey, I am talking to my three security officers to come and catch you."). For example, the system may automatically initiate a change in a status of the FTD (e.g., closing a locking mechanism, initiating an alarm, etc.). The system may generate a contextually relevant (e.g., geo-tagged) alert message and distribute the message to response elements (e.g., mobile agents) by finding the closest or most appropriately equipped response element to the scene area. The alert messages may include navigational information, traffic information, time/space descriptors, or the like. The instructions, alerts, and/or notifications that form the response plan are context-aware and may be in multiple stages based on the computed risk score level.

Furthermore, the system may employ various forms of machine learning in order to optimize response plans based on previous incidents, response plans, response element behaviors, etc. For example, using Incident Similarity: given an incident, the system can identify similar incidents by using historical incidents, context information derived from sensors patterns and other information (such as demography and context), to determine the most appropriate response plan.

The response plan may involve notifying one or more response elements. A response element is an individual, company, or other entity that can respond to an incident. An appropriate response element may be selected from a private security detail and a public law enforcement detail, and is determined based on a variety of factors such as the location of the response element (e.g., geo-location of an armoured car and armed agents) and the capabilities of the response element (e.g., carrying weapons, multiple agents, etc.). Identifying an appropriate response element can also take into account the response-readiness or training or equipment of the elements in the area. An example response element is a mobile agent such as a law enforcement officer in a squad car or motorbike. In embodiments, the response element can be anyone with an app on a phone (dashboard)—thus the range of response elements may be much broader than the small set of security guards typically assigned to guard an ATM or an area containing a FTD.

The mobilization of a response element involves receipt by the response element of an alert message. In embodiments, the response element unpacks the alert message and displays it on an incident dashboard. In embodiments, response elements can access relevant plans through APIs, and site terminals can be updated with new response plans and predicted models.

The systems of the invention involve various components. In an aspect is a system comprising: a processor; and a memory coupled to the processor, the memory configured to store program instructions for instructing the processor to carry out the methods described herein. Other components such as communications modules, calculation engines, etc. are also present in various embodiments, some of which are described below. Also described below are selected programming instructions that may be stored in the memory and used to instruct the systems to carry out the inventive methods.

In embodiments, the system comprises one or more of the following components, and the program instructions are configured to initiate such components: an image and video engine (detects, locates, tracks and identifies moving and fixed object around the scene to understand the context, by combining one or more sensor data); a language engine (analyzes the linguistics aspects of the sensors input to determine the language, dialect, or slang of the perpetrator); a mapping engine (correlates the detected language, dialect, or slang with cluster of socio-economic group); a counting engine (counts the number of people around the scene); a distance engine (calculates the distance between the machine and each of the detected people using infrared technology); a pattern engine (determines the probability of the detected behavior is related to theft incidents using other similarly past incidents and contextual data); and a risk assessor engine (determines the expected risk level if the attack is successful).

In embodiments, the systems comprise a reasoning engine, and the program instructions are configured to initiate the reasoning engine, the reasoning engine configured to calculate the expected risk profile and appropriate response element. The Reasoning Engine (e.g., label 130 in FIG. 1) implements various reasoning functions running on device to understand and characterize the scene/attack, and provides insights to the Response Generator module (e.g., 150 in FIG. 1), by analyzing the sensors' incident data and past incident patterns (stored in the local analytics model). Based on the inputs received from the above components, the Response Terminal (140 in FIG. 1) intelligently interprets the signal inputs and displays deterrent responses, by enabling output sensors (e.g. audio, light) according to the input type. Initiate basic response process by communicating with Response Terminal while the Reasoning Engine determines the next level of responses. The Reasoning Engine can access the current state of the FTD e.g. "out of service", "current money amount", etc. in order to further contextualize the analysis. The Reasoning Engine can also placed on cloud to perform more advanced reasoning give the limitation of site processing (for example, processing of large amount of past sensor data, incident reports, etc. to perform deep reasoning for scene understanding, etc.).

In embodiments, the reasoning engine includes one or more of the following major components: image, audio, and video analytics component that detects, locates, tracks and identifies moving and fixed object around the scene to understand the context, by combining one or more sensor data; a linguistics analyzer component that based on the audio input determines the language, dialect, or slang of the perpetrator based on the audio data extracted from the audio and video sensors; a component that counts the number of people around the scene; a component that computes the distance between the machine and each of the detected people e.g. by using echoes that are sent back from the detected object using infrared technology; a component that determines the probability of the detected behavior is related to theft incidents using other similarly past incidents and contextual data; and a module that determines the expected risk level if the attack is successful.

A Response Generator (e.g., 150 in FIG. 1) generates response plans, e.g., in the form of audio and video, alerts, etc. based on the reasoning engine insights, and initiates the alert generation process when the computed risk score (from the insight) crosses a threshold. The threshold can be configured by the financial institution or programmatically computed based on past acceptable threshold values.

A Real Time Alert Generator (e.g., 160 in FIG. 1) uses the detected incident, metadata associated with it, and other static information from the local store to generate and broadcast summarized alert message (e.g. SMS) to nearby response elements. The generator can further use narrative generation techniques and analytics algorithms for fine-grained alerts.

In embodiments, the system further comprises a speaker configured to relay an audio message such as a message to a perpetrator.

In embodiments, the system comprises a server on a network. In embodiments, the system comprises a local device configured to be installed proximal to or integral with a financial transaction device. In embodiments, the system is contained within a housing and configured to be attached to the financial transaction device or in a location suitable for surveillance of the financial transaction device. In embodiments, the system is configured to communicate the sensor reading(s) to a server via a network, and the server is configured to use the sensor reading in determining a response plan comprising a contextually relevant alert message. In embodiments, the communications component is configured for communicating with a cellular network, a WiFi or Bluetooth network, and/or a LAN or other fixed network. In embodiments, the server is configured to process and display various data gathered by the system in a dashboard for an operator.

In embodiments, the system further comprises a mobile application that assists response elements to quickly respond to incidents. It receives alert signals (e.g., in the form of SMS or text messages) from various sources (e.g., a server, local device, or directly from the sensors deployed in the FTDs), unpacks the message payload and load onto an emergency response map. The agent can further probe the cloud services to request more information (e.g. traffic condition) and analytics insights.

Once a response plan is developed, the various aspects of the response plan must be deployed. This involves, e.g., delivery of alert messages to appropriate recipients. For example, the system further determines a contextually relevant (e.g. geo-tagged) alert message and distributes to mobile agents by finding the closest agents to the scene area. In embodiments, deployment involves instructing the FTD to deliver a message—e.g., the FTD can talk to the perpetrator (even calling them by name if it's an inside job) in order to stop or slow the incident. In embodiments, the deployment comprises transmitting, by the server, an instruction configured to initiate the response from the response element. In embodiments, the deployment comprises transmitting, by the local device, an instruction configured to initiate the response from the response element.

The disclosed systems/methods generate multiple levels of deterrent responses in real time based on multiple sensors' inputs and contextual information to improve emergency response time and the overall security of FTDs. In various embodiments the novel methods extract the linguistics aspects from audio/video sensor data to be used for contextualized deterrent responses generation. The methods involve a novel coordination approach that uses mobile devices and other polarity of data sources described above.

In embodiments, the systems and methods herein involve determination of a deterred response: predict the response required for a given incident based on various static features (these include various aspects of the FTD—the location and IP address where the machine is deployed, responsible personnel on the current date, etc.) and dynamic features (these include ambient environment, context, aspects related to the perpetrator behavior such as type and nature of equipment or instrument used, etc.).

The systems described herein focus on safeguarding the devices and their contents involved in financial transactions, rather than other traditional methods that focus on safeguarding the people involved in financial transactions. In this way, additional contextual input can be obtained and used to fashion a suitable response plan.

Throughout this disclosure, the term "local device" is meant to contrast with a remote server, and refers with a device that is designed/configured to be placed in proximity to a financial transaction device or a location containing such device. A local device may alternatively or in addition be integral with a financial transaction device.

With reference to FIG. 1, there is shown a flow chart for device 100, a local device according to an embodiment of the disclosure. Instrumentation Engine (also referred to as Sensing Engine) 110 collects sensor information from various sensors proximal to or integral with a financial transaction device. Examples include sensors attached to an ATM/POS cabin. In embodiments, Instrumentation Engine 110 aggregates and summarizes raw incident data before passing to the Reasoning Engine 130 as described herein. Instrumentation Engine 110 may also consult local incidents store 120, a local database of known incidents and their characteristics. Information from local incidents store 120 may also be passed to reasoning engine 130. Reasoning engine 130 passes analyzed data to response generator 150, which module then automatically prepares an appropriate response plan. The response plan is communicated to real time alert generator 160. Response terminal 140 and real time alert generator 160 together deploy the response plan, such as by issuing alert 200 and the like. In FIG. 1, sensors are not shown, but as mentioned herein, a variety of sensors may be integrated into the system, including camera, microphone (audio sensor), Infrared (IR) sensor, light sensor, motion sensor, vibration sensor, and touch sensor. For example, a touch sensor, vibration sensor, or accelerometer can be installed at the areas of concern in a ATM/POS cabin to collect and transmit any hit (or touch) incident initiated by a perpetrator.

Figure 2:
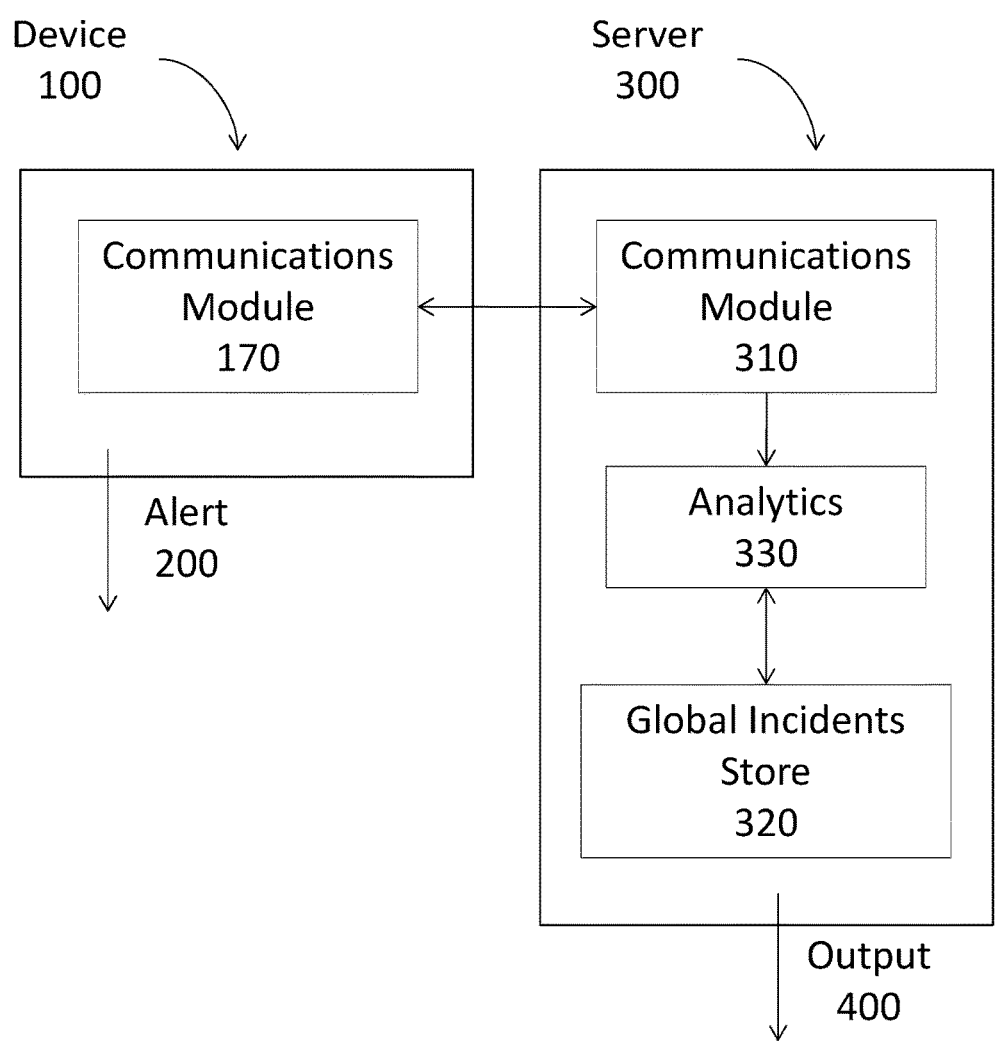
FIG. 2 provides a flowchart for a device and server communicating according to an embodiment of the invention.

Referring to FIG. 2, an embodiment involving remote server 300 in communication with local device 100 is shown. Device 100 may be very basic (e.g., just sensors) or may comprise some analytics similar to device 100 in FIG. 1, and additionally contains communication module 170 for communicating with communications module 310 of server 300. Within server 300, then, analytics 330 comprises some of the various components shown in FIG. 1 (reasoning engine, etc.) and further comprises a global incidents store 320, a database of incidents aggregated from various sources. Server 300 produces a response plan and then produces output 400 based on the plan. Optionally in addition, device 100 may directly provide output such as alert 200.

Figure 3:
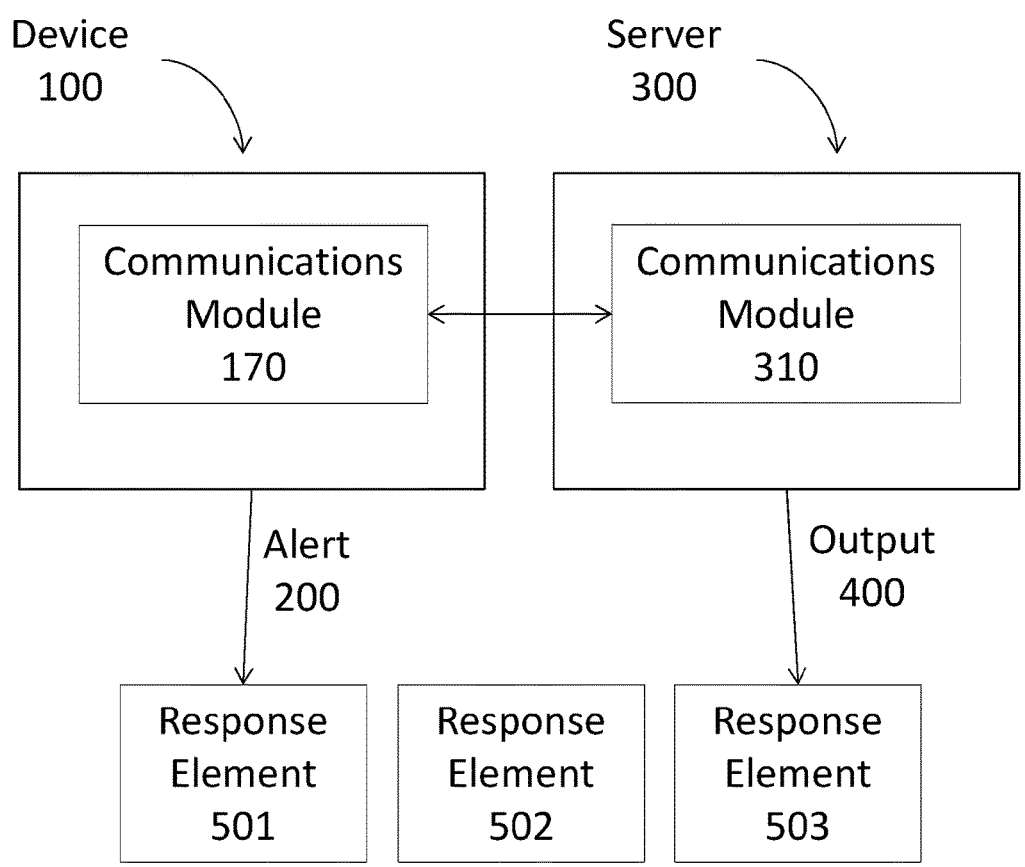
FIG. 3 provides a flowchart for a device and server communicating internally and externally according to an embodiment of the invention.

Referencing FIG. 3, Device 100 and Server 300 are shown as in FIG. 2. The alert 200 and output 400 are sent to appropriately selected response elements, e.g., response element 501 and response element 503, respectively. Selection as described herein is based on a number of factors such as proximity to the FTD, equipment, and training of the response element.

Figure 4:
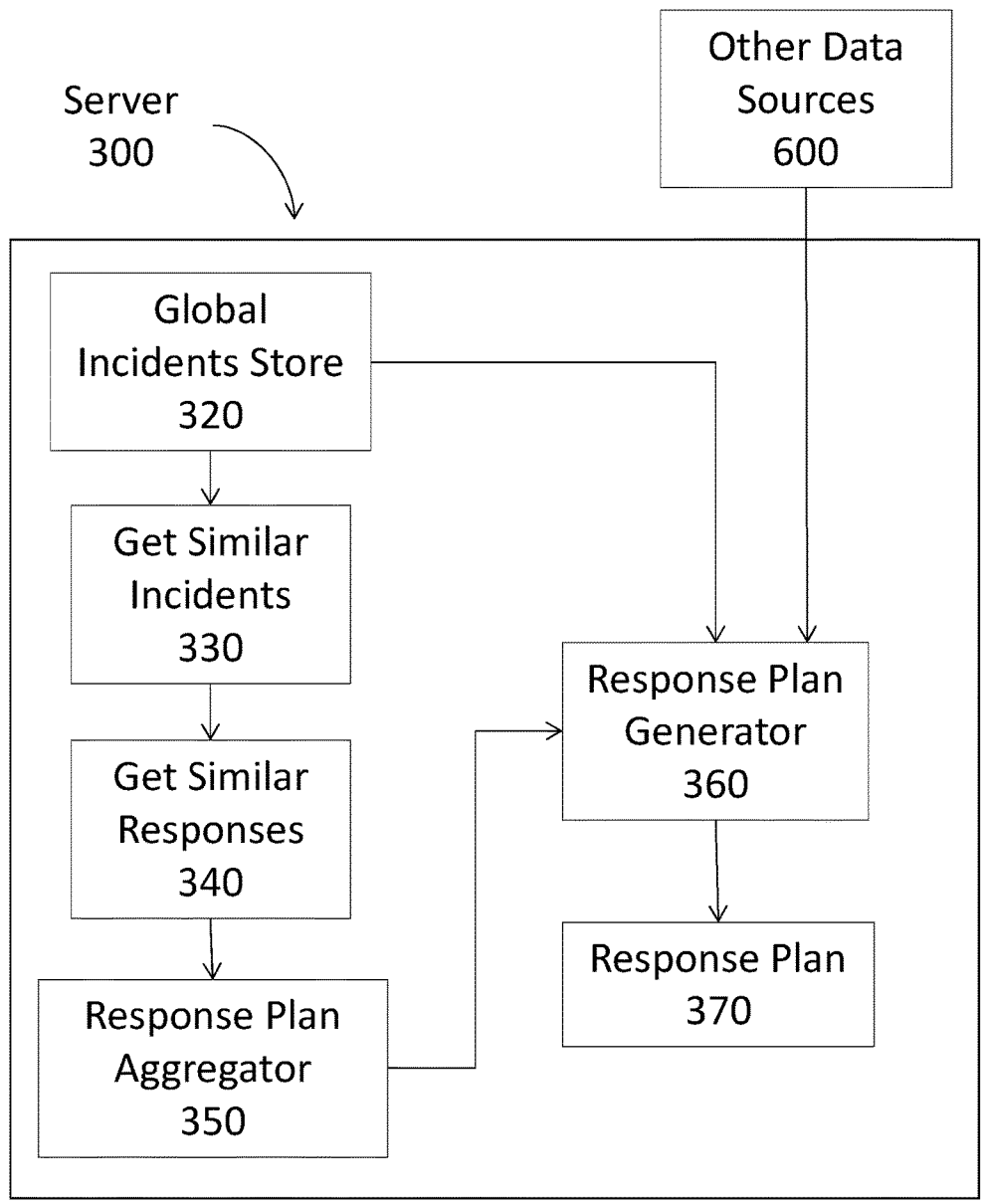
FIG. 4 provides a flowchart for the internal operation of a server according to an embodiment of the invention.

With reference to FIG. 4, generation of response plan 370 is shown within server 300. Information from global incidents store 320 is passed through two stages—get similar incidents 330 and get similar responses 340. The output is provided to response plan aggregator 350. The aggregated similar incidents and responses are sent to response plan generator 360, along with (optionally) data from other data sources 600 and sensor data (not shown) from the local device. The response plan generator 360 generates a response plan 370, which is then deployed as described herein.

Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

EXAMPLES

In an example, a camera in proximity to an FTD counts five people in an image and the IR sensor gives distances of the people. The behaviours of the people are recorded and analysed. The system software has a cognitive scene-understanding module that will allow it to extract all of the relevant information, and then the software determines a response plan. The response plan involves notification of a response element in a given radius from the FTD location, and the selected response element is notified by SMS or other appropriate message.

Figure 5:
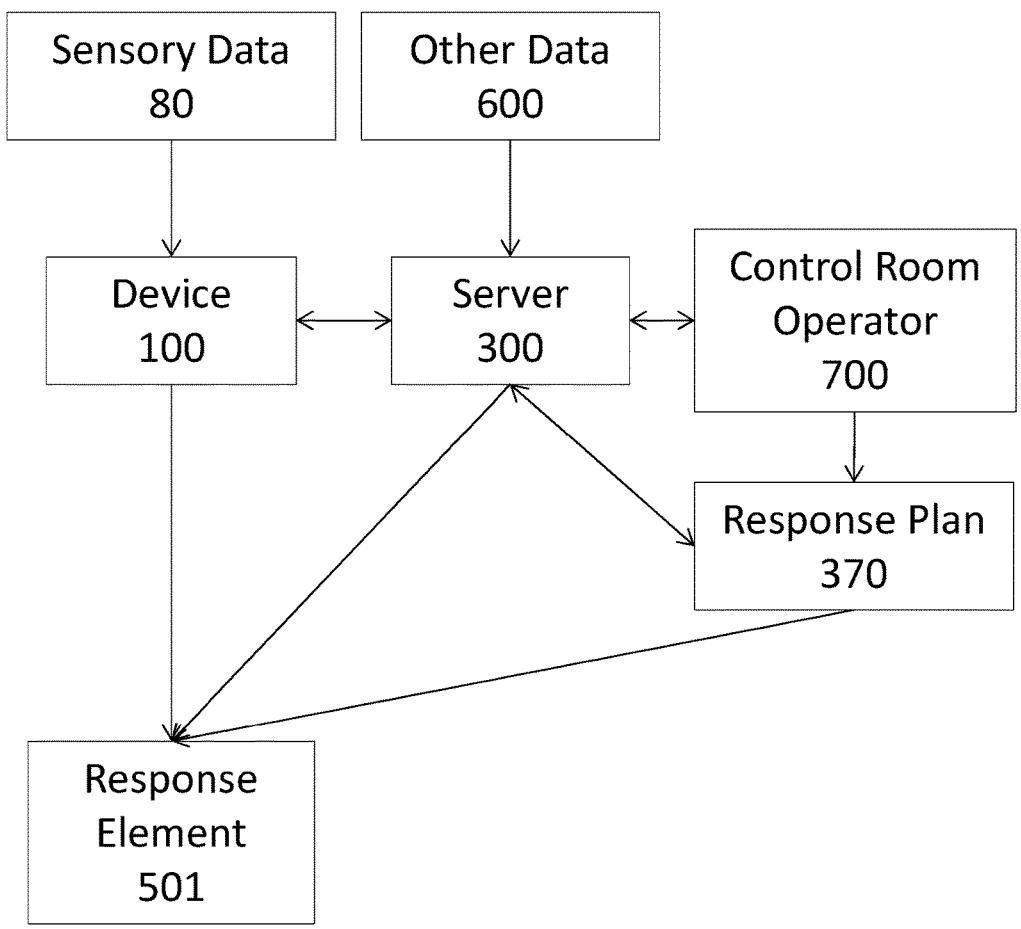
FIG. 5 provides a flowchart for the operation of an embodiment of the system and methods described herein.

In another example, and with reference to FIG. 5, sensory data 80 is gathered by various sensors (not shown). The sensors may be part of device 100 or may be independent and capable of relaying the data to device 100. Furthermore, other data 600 is collected from various sources (not shown but may include weather reports, police reports, etc.) and relayed to server 300. Furthermore, control room operator 700 sits in a control room (not shown) with access to server 300 and also possibly (not shown) access to other data sources such as police scanners and social media sites. Server 300 has access to linked data models, an incident store, an analytics library, social media reports and the like. When an incident occurs, the sensory data, other data, and control room operator input are analysed by device 100 and server 300 in order to alert response element 501 directly as well as to formulate response plan 370 (which, in turn, may alert response element 501).

The invention claimed is:
1. A method comprising:
receiving a sensor reading from a sensor positioned proximal to a financial transaction device, the sensor reading pertaining to an incident;
receiving a contextual data item pertaining to the financial transaction device;
calculating an expected risk profile based on the sensor reading and contextual data item, wherein the expected risk profile comprises a probability that a detected behavior is related to a theft incident and an expected incident description that includes a number of perpetrators, a type of attack, weaponry used in the attack and amount of money in the financial transaction device;

determining an appropriate response element and response plan selected from among multiple possible response options based on the financial transaction device and the expected risk profile, wherein the determining includes evaluating similar historical responses and predicting a behavior of the response element; and initiating a response from the response element.

2. The method of claim 1, wherein the sensor reading and contextual data item are received by a server via a network, the server positioned remote from the financial transaction device, and wherein the initiating a response comprises transmitting, by the server, an instruction configured to initiate the response from the response element.

3. The method of claim 1, wherein the sensor reading and contextual data item are received by a local device proximal to or integral with the financial transaction device.

4. The method of claim 1, wherein the contextual data item is selected from a status of the financial transaction device, financial transaction device ID, a geo-location of the financial transaction device, the time, a traffic report, and an activity report.

5. The method of claim 1, wherein the appropriate response element is selected from a private security detail and a public law enforcement detail, and is determined based on the location of the response element and the capabilities of the response element.

6. The method of claim 1, further comprising determining an appropriate response plan based on the geo-location of the financial transaction device and the expected risk profile.

7. The method of claim 1, further comprising determining an appropriate response plan based on the geo-location of the financial transaction device and the expected risk profile, wherein the response plan comprises initiating an audio message from a device proximal to the financial transaction device, changing a status of the financial transaction device.

8. The method of claim 1, wherein the determining the appropriate response element comprises accepting input from a human operator.

9. A system comprising:
a processor;
a memory coupled to the processor, the memory configured to store program instructions for instructing the processor to carry out the steps of:
receiving a sensor reading from a sensor positioned proximal to a financial transaction device, the sensor reading pertaining to an incident;
receiving a contextual data item pertaining to the financial transaction device;
calculating an expected risk profile based on the sensor reading and contextual data item, wherein the expected risk profile comprises a probability that a detected behavior is related to a theft incident and an expected incident description that includes a number of perpetrators, a type of attack, weaponry used in the attack and amount of money in the financial transaction device;
determining an appropriate response element and response plan selected from among multiple possible response options based on the financial transaction device and the expected risk profile, wherein the determining includes evaluating similar historical responses and predicting a behavior of the response element; and
initiating a response from the response element.

10. The system of claim 9, wherein the program instructions are configured to initiate a reasoning engine, the reasoning engine configured to calculate the expected risk profile and appropriate response element.

11. The system of claim 9, wherein the program instructions are configured to initiate an engine selected from an image and video engine; a language engine; a mapping engine; a counting engine; a distance engine; a pattern engine; and a risk assessor engine.

12. The system of claim 9, wherein the program instructions are configured to identify similar historical responses, apply probabilistic algorithms to find the most likely optimal response plan, and predicted behavior of response elements.

13. The system of claim 9, wherein the program instructions are configured to determine incident severity based on past incident patterns, the sensor reading, and the contextual data item.

* * * * *